Figure 1:
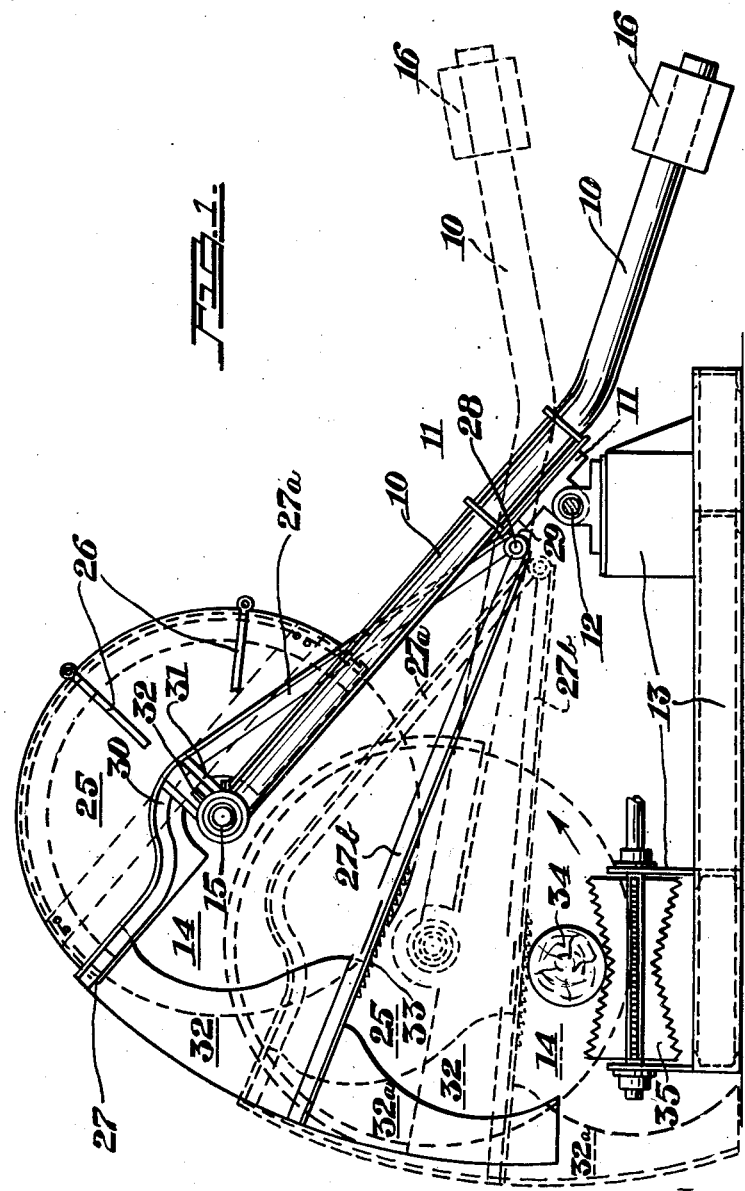

Sept. 30, 1952 J. M. PATON 2,612,191
SWINGING POWER-OPERATED CIRCULAR SAW
Filed Nov. 21, 1949 2 SHEETS—SHEET 1

INVENTOR
JAMES M. PATON
By Fetherstonhaugh & Co.
ATTYS.

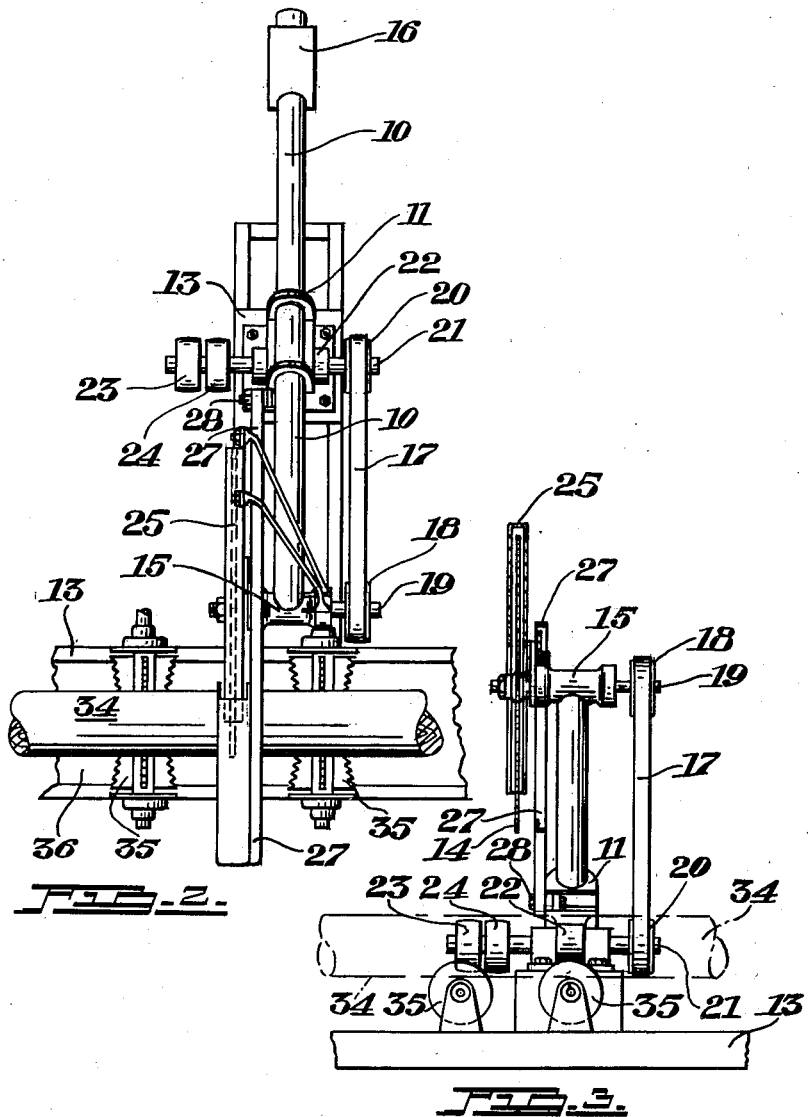

Patented Sept. 30, 1952

2,612,191

UNITED STATES PATENT OFFICE 2,612,191

SWINGING POWER-OPERATED CIRCULAR SAW

James M. Paton, Fort William, Ontario, Canada

Application November 21, 1949, Serial No. 128,606
In Canada September 2, 1949

5 Claims. (Cl. 143—46)

The invention relates to a swinging power operated circular saw and is concerned with means for holding an article to be sawed as well as with means for protecting the operator from accidental contact with the saw blade during the sawing operation.

Prior to the invention, a power operated circular saw in which the saw blade was mounted on a swing arm had the disadvantage that when the swing arm was lowered to bring the saw blade into contact with an article to be sawed, such as a log of wood, the motion of the saw caused the log to be kicked sideways. The sideways movement of the log often resulted in an uneven cut as well as a severe stress on the drive mechanism for the saw, and, in some cases, the saw blade would become jammed. Another disadvantage was that when the saw was in either its upper position or its lower working position, the lower half of the saw blade was exposed so that an operator could accidentally come into contact with it. To overcome this latter disadvantage, it has been proposed that a saw guard be provided which would completely enclose the saw blade when the saw blade was in its upper position. This guard was provided with a trackway so that when the swing arm was lowered the lower edge of the guard would contact the upper edge of the log causing the guard to be raised vertically as the saw cut into the log. However, this form of a guard had the disadvantage that the part of the saw in engagement with the log was exposed to the operator.

According to the invention there is provided a power operated circular saw mounted on a swing arm which overcomes both the disadvantage of movement of the log during sawing and the disadvantage of having part of the saw blade exposed to the operator. According to the invention an article engaging swing arm is pivotally fixed to the saw swing arm at a point between the point of pivoting of the saw swing arm and the axis of rotation of the saw blade. The article engaging swing arm extends in the same general direction as the saw swing arm and has a set of teeth which engage the upper part of the article to be sawed when the saw swing arm is lowered. Means is provided to rotate the circular saw blade in a direction such that the edge of the blade nearest the article to be sawed moves toward the point of pivoting of the saw swing arm. In a preferred form of the invention the article engaging swing arm has a saw guard fixed to it so that the guard extends downwardly in a vertical direction to protect the part of the saw blade which extends beneath the saw swing arm.

In a circular saw machine according to the invention, the article to be sawed is firmly held against the bed of the machine during the sawing operation by the teeth of the article engaging swing arm. The bed of the machine, according to this specification and the attached claims, is meant to include the means of support for the article to be sawed, for example, a conveyor. The firm engagement of the teeth with the article to be sawed is due to the point of pivoting of the second swing arm being between the point of pivoting of the first swing arm and the axis of rotation of the circular saw blade. As the saw swing arm is lowered, it causes the article engaging swing arm to move longitudinally of itself away from the point of pivoting of the saw swing arm and across the article to be sawed. This movement of the article engaging arm, which is in a direction opposite to that of movement of the edge of the circular saw blade in contact with the article, causes the set of teeth on the article engaging swing arm to be firmly jammed into the article to be sawed holding it firmly against the force of the rotating circular saw blade. In the preferred form of the invention referred to above, the downwardly extending guard moves with the article engaging swing arm and protects the operator from contact with the part of the circular saw blade which engages the article to be sawed.

The invention will be further described by reference to the attached drawings which illustrate an embodiment of it, and in which:

Figure 1 is a side elevation of the power operated circular saw according to the invention, Figure 2 is a plan view of the saw shown in Figure 1, and Figure 3 is a cross section taken on the line 3—3 of Figure 1.

As shown in the drawings, a swing arm 10 is mounted in a cradle 11 which is pivotally fixed on a bearing 12 to a bed 13 of the circular saw machine. The circular saw blade 14 is rotatably mounted by a bearing 15 at one end of the swing arm 10. At the other end of the saw swing arm 10 is a counterbalancing weight 16 which may be adjusted to a suitable position along the swing arm 10 and the swing arm 10 may be moved longitudinally in the cradle 11 for adjustment purposes. As shown in Figures 2 and 3, the circular saw blade 14 is driven by a belt 17 running over a pulley 18 on a shaft 19 to which the circular saw blade 14 is fixed. The other end of the belt 17 is driven by a pulley 20 fixed to a shaft 21 which extends through a bearing 22 to a drive pulley 23 and an idler pulley 24.

A source of power (not shown) can be connected by a belt to the drive pulley 23. As shown in all the figures, a guard 25 covers the upper half of the circular saw blade 14 and is fixed to the saw swing arm 10 by brackets 26.

An article engaging swing arm 27 having an upper branch 27a and a lower branch 27b is pivotally connected at the junction of the branches 27a and 27b to the saw swing arm 10 at a bearing 28 in an extension 29 of the cradle 11. The article engaging swing arm 27 extends to the outer edge of the guard 25 and has a curved section 30 above the bearing 15. A bracket 31 is attached to the curved section 30 of the swing arm 27 and holds a rubber bumper 32 which rests against the outer surface of the bearing 15 when the circular saw blade 14 is in the upper position shown in solid line in Figure 1. At the outer end of the article engaging swing arm 27, is an intermediate guard 32 and a lower guard 32a which extend in a vertical direction downwardly in front of the cutting edge of the circular saw blade 14. Along the lower edge of the article engaging swing arm 27 is a set of teeth 33 which are adapted to engage the upper part of an article to be sawed such as a log 34 as shown in the figures. The log 34 is brought into position beneath the circular saw blade 14 by passing it along the rollers 35 of a conveyor 36 which forms part of the bed 13 of the machine.

In operation the circular saw blade 14 is driven by power applied to the pulley 23 and transmitted to the belt 17 which drives the shaft 19. The direction of rotation of the circular saw blade 14 is such that the edge of the blade 14 next the log 34 moves in a direction toward the bearing 12 of the saw swing arm 10 as shown by the arrow in Fig. 1. When the log 34 is brought into position beneath the circular saw blade 14 the saw swing arm 10 is lowered bringing the lower part of the cutting edge of the saw blade 14 into contact with the upper edge of the log 34. At the same time, the edge of the blade 14 contacts the upper edge of the log 34, or preferably just before the blade contacts the log 34, the set of teeth 33 bears downwardly on the upper part of the log 34 and is pushed in a horizontal direction across the top of the log 34 due to the downward motion of the arm 10 displacing the pivot point of the article engaging arm 27 in a direction toward the log 34. The combined downward and horizontal movement of the teeth 33 causes them to bite into the surface of the log 34 and at the same time apply a force to the log 34 which opposes the force acting on the log 34 due to the rotating saw blade 14. As the saw blade 14 bites into the log 34 the teeth 33 on the article engaging swing arm 27 maintain their firm hold on the log 34 due to the downward motion of the saw swing arm 10 and, at the same time the intermediate guard 32 and the lower guard 32a move downwardly providing complete protection for the operator from possible contact with the part of the saw blade 14 while it is in engagement with the log 34.

What I claim as my invention is:

1. A power operated circular saw comprising, a saw swing arm, means for pivotally supporting the saw swing arm, a circular saw blade operatively mounted on the saw swing arm, an article engaging swing arm pivotally fixed to the saw swing arm at a point at a substantial distance from the point of pivoting of the saw swing arm but between said point of pivoting and the axis of rotation of the circular saw blade, a set of teeth located on the article engaging swing arm so that the teeth engage the part of an article first to be cut by the saw during operation of the saw and tend to urge said article away from the point of pivoting the saw swing arm, and means for rotating the circular saw blade in a direction such that the edge of the circular saw blade engaging the article to be sawed moves toward the point of pivoting of the saw swing arm.

2. A power operated circular saw according to claim 1 in which the article engaging swing arm is pivotally fixed to the saw swing arm at a point closer to the point of pivoting of the saw swing arm than to the axis of rotation of the circular saw blade.

3. A power operated circular saw according to claim 1 in which the article engaging swing arm is supported by the saw swing arm when the circular saw blade is out of engagement with the article to be sawed.

4. A power operated circular saw according to claim 1 which comprises an upper guard fixed to the saw swing arm and covering the edge of the circular saw blade extending above the saw swing arm, and a guard telescopic with the upper guard and so fixed to the article engaging swing arm as to extend in a vertical direction in front of at least part of the cutting edge of the circular saw blade not covered by the upper guard.

5. A power operated circular saw according to claim 4 in which the article engaging swing arm is supported by the saw swing arm when the circular saw blade is out of engagement with the article to be sawed.

JAMES M. PATON.

REFERENCES CITED

The following references are of record in the file of this patent:

UNITED STATES PATENTS

| Number | Name | Date |
|---|---|---|
| 410,777 | Abbott | Sept. 10, 1889 |
| 1,481,569 | Tannewitz | Jan. 22, 1924 |
| 2,310,152 | Ronning | Feb. 2, 1943 |
| 2,420,836 | Nelson | May 20, 1947 |

FOREIGN PATENTS

| Number | Country | Date |
|---|---|---|
| 67,680 | Norway | Apr. 23, 1941 |